Patented Aug. 23, 1938

2,127,629

UNITED STATES PATENT OFFICE 2,127,629

NUTRITION OF POTTED PLANTS

Linus H. Jones, Amherst, Mass., assignor to W. Bartlett Jones, Chicago, Ill.

No Drawing. Application March 27, 1937, Serial No. 133,379

6 Claims. (Cl. 47—58)

The present invention relates generally to plant nutrition, and in particular to fertilizing masses to be buried as such in the soil. It has special reference to the nutrition of plants in pots or containers where the plants are grown indoors, as in homes and in greenhouses, but its utility is not limited thereto. The invention relates to both the character of the fertilizer and to its use.

There are many fertilizers available and these are generally chemical compounds, (usually soluble salts), and putrescible organic nitrogenous compounds. The chemical salts are quickly available and are potent. The putrescible substances become slowly available by their decomposition which takes place in or on the soil. For quick results, soluble chemicals are employed. However, the soluble fertilizers increase the dangers of fertilizer injury.

In the growth of plants there are important stages pertinent to the present invention. After the germination stage, a plant enters the vegetative stage and then the blossoming stage. Most potted plants are desired and grown for a blossoming stage, but they must have had a sufficient growth and development in order to reach a condition in which to initiate flower-bud differentiation. "Initiating flower-bud differentiation" is a process whereby certain cells take on a new habit of activity and arrange themselves so that they will eventually develop reproduction organs. Thus an apple tree differentiates in June and July to form a flower bud that will complete its final development in the following May.

It is not generally known by the layman that a plant may be shifted from the blossoming to the vegetative stage by control of the character of fertilizer. The feeding of soluble salts or chemical fertilizers to a plant in sufficient quantity actually does this. Many of the plant foods today on the market for household use are efficient in quickly producing new growth in potted plants, and hence they are hailed as successful foods. The applicant has made many comparisons of such fertilizers and has determined that many are improper ones for the purpose of securing a healthy blossoming plant with luxuriant growth. Those fertilizers which are wholly or largely chemical salts or inorganic compounds to provide nitrogen, potash and phosphorus, are so quickly taken up that they throw the plant into the vegetative stage and keep it from entering the blossoming stage. The luxuriant growth which is so quickly obtained has little to sustain it after the fertilizer is exhausted. Continued feeding is then necessary, and this keeps the plant out of the blossoming stage. Cessation of feeding it cause the growth to take all the available nourishment and there is not enough to induce blossoms. The plant usually dies down in case the feeding of the chemical salts is stopped.

As a consequence the applicant has proven that the insoluble putrescible types of fertilizer are the proper ones to use, in whole or in substantial part, more particularly where nitrogen is concerned. Materials such as manure, sewage sludge, fish meal, slaughter house waste, etc., which are of putrescible organic nitrogenous matter, are suitable for keeping a plant out of the vegetative stage and in the blossoming stage with a luxuriant growth in the blossoming stage. Of course, use of such fertilizers is not new, and these have been used heretofore, both out-of-doors and in-doors, in extensive fields, or beds, or in pots or other containers. Use of such materials in-doors is attended with bad odors. Hence they have not met with success in such fields. The odor comes from the spilling of some of the putrescible material on the surface of the soil, where it begins to decay. If it is dry, the putrescible material may have little odor, but on being subjected to moisture and exposed, the bad odors of decomposition arise, and fertilizer value is lost into the atmosphere to a considerable extent.

The purposes of the present invention are to provide for the feeding of such plants on a simple scheduled basis, to avoid odors, to produce a healthy vigorous growth, to favor a blossoming or reproductive stage, to disfavor the vegetative stage, and to avoid a starvation stage, and to provide a simple scheme for these ends.

Various other objects and advantages of the invention will appear from the following description and explanation of the invention.

By many and long series of experiments I have determined that the content of nitrogen in a form which is immediately available about the roots of a plant, is a critical factor in establishing the vegetative habit. Too high a concentration forces vegetative growth at the expense of differentiation for bud formation. Concentration may be kept low in the case of using soluble nitrogen salts by giving small doses very frequently. But this is not wholly satisfactory. I have also noted indications that bacterial activity has some important role, perhaps in the production of plant "homones" of which a scientific knowledge is just beginning. At least nature's method of feeding is largely by bacterial decomposition of nitrogenous bodies.

I have learned also that too low a concentration of available nitrogen makes the plant suffer from nitrogen deficiency, so that a vigorous healthy condition and reproductive response are not attained, yet the plant is not starved for nitrogen. I have found that where nitrogen is present or kept just above the level of its rate of assimilation, the plant is healthy, vigorous, not highly vegetative, and attains the reproductive habit. By the practice of the present invention I provide a simple scheme for treating a potted plant to feed to it available nitrogen at a proper level of concentration to meet the desired ends. This is accomplished by a periodical application of decomposable organic nitrogenous nutriment on a dietary basis.

For example, when I use test potted plants known to be starved for nitrogen, and bury in the dirt of each, one or more en masse units of insoluble putrescible nitrogenous substance in a set ratio to volume of earth and roots, I find that the plants attain a return to vigor in a more or less set time, and that this vigor continues for a set period. After this period the plant declines to its starvation stage again. By such tests I determine when a repetition of the feeding is necessary to maintain an even tone of vigor. I have found that a new feeding should be applied, as much in advance of the beginning of decline, as is required to attain full vigor from the starvation point. Thus, I arrive at a time schedule for a given dose of nutriment. By changing the dose, the time period for application can be changed. For convenience, I have worked largely for a monthly schedule, inasmuch as this is a practical period.

I have aimed to operate upon the longest interval at which the results are readily obtained and find that this is determined by the rate of decomposition. This in turn is dependent upon the mass quantity employed and upon the physical form of the mass. Where a mass quantity is used containing the decomposable nitrogenous matter in quantity of at least .05 gram equivalent of ammonia, it takes from 14 to 20 days for decomposition to proceed so far that odor of decomposition ceases upon uncovering for nasal inspection. The more loose the mass the earlier this ceases, as where it is housed in a capsule, and the more compact the mass, the longer it takes, as when it is in a compressed tablet. Also, colder temperatures slow down the rate of decomposition, but this factor is negligible, because it parallels the change in rate of assimilation by the plant with change in temperature.

I have determined that an approximately monthly basis is about the longest interval of application which may be used for units not smaller than that above specified. Since the average pot takes more than one such unit, the period may be shortened if desired. That is, in place of using two such units per month, one unit bi-monthly will suffice. Where it is attempted to use a longer period such as six weeks or two months, it will be found that too high a concentration is first attained, followed by too low a concentration, so that the plant is over-stimulated and then suffers from a deficiency with respect to nitrogen. This irregularity prevents proper development of the reproductive stage, and interferes with maintaining an even tone of health and vigor.

In determining the dose, I have found that the greater the volume of dirt and roots combined, (hereinafter referred to as volume of dirt without reference to roots), there is a variation in the ratio of nutriment to volume of dirt. As the volume of dirt increases the dose per unit volume may decrease. Smaller pots take more in proportion to larger pots for the same schedule. This is practically explained by several factors. Plants normally in small pots are growing faster and add more growth than plants in larger pots. Also, the surface area or exposure of dirt is greater in proportion to volume in small pots than in larger pots, and there is more loss by traces of nitrogenous gases escaping. That there is such loss in nitrogen by gases escaping can be attested by the attraction of mice and dogs to the pots in which the present invention is being practiced.

Using a certain formula, in unit pills or capsules, hereinafter to be described, I have determined that the ratio follows a more or less truly logarithmic curve for the average run of pots, up to and including the 6-inch pot. The 7-inch pot may be taken care of readily by 5 or 6 units, and where the figure is about 5.5, it passes out from within the logarithmic zone. The effect of pot size begins to be lost at about 150 cubic inches and thereat and thereabove the relation is approximately an arithmetical one rather than a logarithmic one.

For example I have found by many tests that the following figures apply to a monthly schedule of feeding:

*Table I*

| (1) No. of test units | (2) Cubic inches of dirt | (3) Size of pot in inches | (4) Volume of dirt in cubic inches |
|---|---|---|---|
| 1 | 10–20 | 3 | 16 |
| 2 | 20–50 | 4 | 40 |
| 3 | 50–90 | 5 | 72 |
| 4 | 90–150 | 6 | 128 |
| 5 (or 6) | 150–220 | 7 | 208 |

Column (1) represents the number of test units of food required to take care of the volume of dirt of column (2). The permissible latitude is given under which the monthly schedule may be maintained. Column (3) is a practical correlation of size of pot (standard) in inches with the approximate volume of dirt shown in column (4), which can be cared for by the test units of column (1).

When the range of column (2) is plotted on coordinate paper against dosage of column (1) the two resulting curves define a curved band of apparent logarithmic form. By plotting the logarithms of the limiting values of column (2) against values of column (1) two substantially straight parallel lines result, showing the ratio to be substantially a logarithmic one. Calling the units of column (1) $t$ and the respective high and low volumes of column (2) $v'$ and $v$, the mathematical relationship may be expressed definitely by graphs in which two parallel lines form an inclined band, bounded by the lines of equations $$3t = 10 \log v' - 10$$
$$3t = 10 \log v - 7$$

The invention does not call for mixing a powdered or bulk fertilizer into dirt for potting plants. This would distribute the nutrient powder too much, so that it becomes too early available for the desired results. Rather, the invention calls for burying en masse bodies of the nutriment in one or more localized units. This has been accomplished by housing it loosely in capsules, or by forming it by pressure into tablets or pills, and burying one or more of these units. Also, holes may be punched in the dirt and the bulk dose dropped in the hole and covered. By this procedure, the mass becomes a center of putrefaction and its own poisons retard bacterial progress to make the effect extend over a greater period of time, than if it were more highly distributed. Nitrogenous gases and products diffuse through the earth to the roots. Considerable nitrogen value becomes stored in the bacterial bodies created, and these remain as a reserve supply of various food values which the plant later consumes when the actual supply of the buried mass has disappeared. In other words, when the release of nitrogen values is high there is competition for it by the plant and by the bacteria for their body structure. Then when the main nitrogen source is depleted, the dead bacteria provide a reserve supply. Thus, there is a leveling factor.

I have found that there is some variation in the time period required to attain full vigor from a starvation stage, resulting from the physical form of the en masse unit. A bulk mass, or loose material in a gelatin capsule acts a few days quicker than where a hard compressed tablet of the same material is used, and such a tablet is still quicker than one which is variously coated, unless coated by a gelatin or protein substance. But these differences in form do not ultimately disturb the scheme in a long-time practice of the invention, because by following the regular schedule with any given form the period of availability becomes regular.

The invention contemplates use of organic insoluble putrescible nitrogenous substance, so that the implant retains its locus, and is not diffused by solution throughout the dirt like chemical salts. Materials such as animal and poultry manure, sewage waste, slaughter-house waste, tankage, fish meal, and the like are suitable, and should be used upon the basis of their nitrogen content. Fish meal is a very excellent one of these to use, because it is a product which results from leaching out from fish waste, such as cod, the water soluble nitrogenous material, as for example to make fish glue. It is also desirable because it contains bone which provides needed phosphate and calcium, and in good proportion to the nitrogen introduced. It lacks potassium, but this can be added as explained later.

Fish meal which I have used has an ammonia content of about 10%, and a content of bone of about 30%. By using in each test unit $t$ a mass of a half-gram of fish meal plus 10% of a potassium salt, the data of Table I represents use of a nitrogen equivalent to .05 gram of ammonia. Unit $t$ contains:

.05 gram of ammonia
.15 gram of bone
.05 soluble potassium salt

I have found that 10% of a soluble potassium salt (based on fish meal employed) gives a balanced fertilizer, whether the potash so added is in the form of chloride, carbonate, sulphate or nitrate. The latter of course introduces a soluble nitrogen content, but this is not sufficient to disturb the balance sought or the schedule to be used. In fact commercially it is desirable where the invention is newly adopted on starved plants, because results are more quickly observed. This quantity of soluble potash salt, even as nitrate, does not alter the property of the mixture to create and maintain the blossoming stage on the prescribed testing schedule. This has been determined by using potassium as nitrate and as carbonate in comparative tests.

The invention has been carried out by using both small and large units varying from .5 gram of fish meal up to about 3 grams of fish meal, with substantially the same results. It is preferred, however, to use the smaller units for household purposes and to specify one or more of them for burial for the different sized pots. However, since pots may vary from a standard of size, since the nitrogenous base of the fertilizer may vary, and since the invention is one of application for maintaining a concentration effect, it is preferred to express the invention in more accurate terms so that it may be related to instant conditions.

It is well known that a balanced fertilizer, contains nitrogen, phosphorus and potash. Neither the potash nor the phosphate of a balanced fertilizer is important in stimulating the plant into growth, or the habits of growth herein discussed, however much they may be necessary for such growth. Therefore, the invention is broadly expressed in terms of the nitrogen supply, and it is to be understood that the potash and the phosphate may be used so as not to alter that nitrogen supply any more than would the 10% potassium nitrate above discussed.

Referring to the equations above given for the determined monthly schedule, it may be further stated that $$x = \text{grams of ammonia} = .05t$$

The equation relating test units to volume may be rewritten as $$3t = 10 \log V - a$$

where $V =$ volume of dirt and roots in cubic inches and $a = 7$ to $10$

Rewriting this equation in these new terms, the formula is obtained:

$$60x = 10 \log V - a$$

which is the formula of the invention for a monthly schedule up to and including the 6-inch pot or roughly up to about 150 cubic inches.

By this formula the volume of dirt and roots in a pot may be used to calculate the monthly requirement of ammonia when applied as insoluble putrescible organic nitrogenous material in en masse units of at least .05 gram ammonia content, whether planted all at once or periodically during the month. From the analysis of any fertilizer material the weight required may be calculated. Preferably phosphate is added with it in some slowly available form such as bone, or as superphosphate. Potassium is also added in suitable amounts, but not to excess when it is in the form of nitrate. Potassium nitrate is equivalent to 17% of its weight of ammonia. Therefore, where potassium nitrate may be used up to 10% of the amount of fish meal, it permits introduction of up to 17% soluble ammonia equivalent in addition to the insoluble ammonia equivalent (as 100%) without departure from the control herein set forth. It is taken up quickly before the bacterial decomposition renders the other added nitrogen available.

In order to determine the arithmetic ratio which exists in high volumes of confined dirt, such as larger pots, tubs and urns, the above formula at near its limiting value may be used to eliminate the logarithmic variation. Thus, where 150 cubic inches is an approximate upper limit for V, the formula therefore gives values of $x$ ranging approximately from ⅕ to ¼. Where $T$ = volume in cubic inches when it is at or above 150 cubic inches, and taking as the arithmetic proportion:

$$x = kT$$

then $$k = .00133 \text{ to } .00166$$

For example, a tub having 2000 cubic inches will require from 2.7 to 3.3 grams of ammonia equivalent per month when applied as insoluble putrescible organic nitrogen in units or masses of at least .05 gram of ammonia equivalent each. If fish meal is used, which is 10% in ammonia equivalent, then 27 to 33 grams of fish meal are required.

In using the present invention, watering in a proper way must be practiced. Other factors must not be permitted to interfere. For example, in clay porous pots, proper humidity conditions in the pot walls should be maintained, as set forth in my application Serial No. 86,897, filed June 24, 1936. This need not be considered in non-porous pots.

Where nitrogen starved plants are initially used for practice of the invention monthly, they can be brought in 4 to 5 months into a continuous state of health and vigor and into a reproductive habit, and out of a vegetative habit. As much as 500% to 3600% improvement can be obtained on a weighted measurement of the increase in flowers, stalks of flowers and number of leaves, over comparative plants grown therewith under the same conditions except for the feeding. A third set of comparative plants, fed at the same time with the same value of nutriment, but as chemical salts of equivalent value, are ragged in appearance, lack the vigorous healthily condition and the flowers or flower stalks, but may have leaf stalks, and less leaves, owing to spurts of vegetative growth, followed by periods of decline and nitrogen deficiency.

The present application is a continuation in part of my prior application Serial No. 679,280, filed July 7, 1933, now U. S. Patent No. 2,091,993, issued September 7, 1937, and my application Serial No. 28,760, filed June 27, 1935, now Patent No. 2,117,808, issued May 17, 1938.

I claim:

1. The method of feeding potted plants and the like to control the stage of development of the plant to favor the reproductive stage and to disfavor the vegetative stage, which comprises burying monthly in the earth about a plant one or more en masse bodies each consisting of at least ½ gram of fish meal having a 10% ammonia equivalent to provide nitrogen and 30% of bone to provide phosphate, and about .05 gram of a potassium salt, according to the formula $$60x = 10 \log V - a$$

wherein $x$ = the ammonia equivalent of the fish meal in grams, $V$ = volume of potted dirt and roots in cubic inches, and $a$ = 7 to 10 up to a value of $V = 150$, and above such value of V according to the formula $$x = kT$$

where T represents the cubic inches of dirt and roots and $$k = .00133 \text{ to } .00166$$

2. The method of feeding potted plants which comprises burying at approximately regular intervals of once a month in the dirt one or more unit masses of a plant food in which nitrogen is provided predominantly as insoluble organic putrescible nitrogenous material in at least .05 gram of ammonia equivalent for buried unit, and the quantity being determined by the equation $$6x = 10 \log V - a$$

wherein $x$ = the ammonia equivalent in grams,
$V$ = cubic inches of roots and dirt up to 150 cubic inches,
$a$ = 7 to 10 and according to the equation $x = kT$
where $T$ = cubic inches of roots and dirt above 150 cubic inches,
and
$k = .00133$ to $.00166$.

3. The process of claim 2 in which food values providing phosphorus and potash are also provided in the unit in form lacking available nitrogen.

4. The process of claim 2 in which food values providing phosphorus and potash are also provided in the unit in form containing soluble nitrogen up to 17% of the insoluble nitrogen, both calculated as ammonia equivalent.

5. The method of feeding potted plants and the like to control the stage of development of the plant to favor the reproductive stage and to disfavor the vegetative stage, which comprises burying monthly in the earth about a plant one or more en masse bodies each consisting of insoluble organic putrescible nitrogenous substance with an ammonia equivalent of at least .05 gram, from 0 to .0085 gram of ammonia equivalent of soluble nitrogen, and also potash and phosphorus nutrient values, the quantity and time of burial being such as to provide insoluble nitrogen per month in quantity $x$ according to the equation $$60x = 10 \log V - a$$

wherein $x$ = the ammonia equivalent in grams,
$V$ = cubic inches of roots and dirt up to 150 cubic inches,
$a$ = 7 to 10 and according to the equation $x = kT$ where $T$ = cubic inches of roots and dirt above 150 cubic inches, and $k$ = .00133 to .00166.

6. The method of feeding nitrogen to potted plants and the like to control the stage of development and disfavor the vegetative stage, and to maintain an even tone of vigor without nitrogen deficiency which comprises burying mass units of nitrogenous food in the soil regularly at least as often as once per month, each unit being characterized by a nitrogen content consisting of at least .05 gram of ammonia equivalent in the form of insoluble organic putrescible nitrogenous substance subject to bacterial decay to release its nitrogen content, and from 0 to .0085 gram of ammonia equivalent in the form of quickly available soluble nitrogen nutrient, the total quantity $x$ of said insoluble nitrogen per month being determined by the cubical contents of the potted dirt and roots according to the equation $$60x = 10 \log V - a$$

wherein $x$ = the ammonia equivalent in grams,
$V$ = cubic inches of roots and dirt up to 150 cubic inches,
$a$ = 7 to 10 and according to the equation $x = kT$ where $T$ = cubic inches of roots and dirt above 150 cubic inches, and $k$ = .00133 to .00166.

LINUS H. JONES.

CERTIFICATE OF CORRECTION.

Patent No. 2,127,629.  August 23, 1938.

LINUS H. JONES.

It is hereby certified that error appears in the printed specification of the above numbered patent requiring correction as follows: Page 2, first column, line 9, for ""homones"" read "hormones"; page 4, second column, line 36, claim 2, for the word "for" read per; and line 38, in the equation, for "6x" read 60x; and that the said Letters Patent should be read with this correction therein that the same may conform to the record of the case in the Patent Office.

Signed and sealed this 11th day of October, A. D. 1938.

Henry Van Arsdale (Seal)  Acting Commissioner of Patents.

being such as to provide insoluble nitrogen per month in quantity $x$ according to the equation $$60x = 10 \log V - a$$

wherein $x$ = the ammonia equivalent in grams,
$V$ = cubic inches of roots and dirt up to 150 cubic inches,
$a$ = 7 to 10 and according to the equation $x = kT$ where $T$ = cubic inches of roots and dirt above 150 cubic inches, and $k$ = .00133 to .00166.

6. The method of feeding nitrogen to potted plants and the like to control the stage of development and disfavor the vegetative stage, and to maintain an even tone of vigor without nitrogen deficiency which comprises burying mass units of nitrogenous food in the soil regularly at least as often as once per month, each unit being characterized by a nitrogen content consisting of at least .05 gram of ammonia equivalent in the form of insoluble organic putrescible nitrogenous substance subject to bacterial decay to release its nitrogen content, and from 0 to .0085 gram of ammonia equivalent in the form of quickly available soluble nitrogen nutrient, the total quantity $x$ of said insoluble nitrogen per month being determined by the cubical contents of the potted dirt and roots according to the equation $$60x = 10 \log V - a$$

wherein $x$ = the ammonia equivalent in grams,
$V$ = cubic inches of roots and dirt up to 150 cubic inches,
$a$ = 7 to 10 and according to the equation $x = kT$ where $T$ = cubic inches of roots and dirt above 150 cubic inches, and $k$ = .00133 to .00166.

LINUS H. JONES.

CERTIFICATE OF CORRECTION.

Patent No. 2,127,629.                     August 23, 1938.

LINUS H. JONES.

It is hereby certified that error appears in the printed specification of the above numbered patent requiring correction as follows: Page 2, first column, line 9, for ""homones"" read "hormones"; page 4, second column, line 36, claim 2, for the word "for" read per; and line 38, in the equation, for "6x" read 60x; and that the said Letters Patent should be read with this correction therein that the same may conform to the record of the case in the Patent Office.

Signed and sealed this 11th day of October, A. D. 1938.

Henry Van Arsdale (Seal)                                    Acting Commissioner of Patents.